Sept. 19, 1939.　　　　M. STALEY　　　　2,173,289
ELEVATOR CONTROL MEANS
Filed Oct. 1, 1937　　　　2 Sheets-Sheet 1

INVENTOR
Marcellus Staley
BY
R. J. Critchard
ATTORNEY

Sept. 19, 1939.    M. STALEY    2,173,289
ELEVATOR CONTROL MEANS
Filed Oct. 1, 1937    2 Sheets-Sheet 2

INVENTOR
Marcellus Staley
BY
ATTORNEY

Patented Sept. 19, 1939

2,173,289

UNITED STATES PATENT OFFICE 2,173,289

ELEVATOR CONTROL MEANS

Marcellus Staley, Brooklyn, N. Y.

Application October 1, 1937, Serial No. 166,756

17 Claims. (Cl. 187—29)

My invention relates to improvements for control systems for electric elevators, and, more particularly, to an arrangement acting to balance and compensate for varying loads applied to the car, to effect, precise level floor stops, thus performing a safeguard function in normal operations of the car, and operable, at predetermined loads, to automatically control one or more additional safeguard operations.

One of the objects of the invention is to provide for one or more circuits for an elevator control system, control means movable in proportion to load applied to the car, whereby the operation of said one or more circuits, and the performance of one or more safeguard functions, is dependent upon the load condition of the car.

Another object is to provide a circuit controlling car-stopping operations and a load balancing and compensating system carrying means controlling the circuit, said means being movable proportionately to load applied to the car, to perform the safeguard function of providing for load-controlled initiation of car-stopping operations to effect precise, level floor stops under all conditions of operation of the car under load.

Another object is the provision of a load balancing and compensating system controlling, as described, a safeguard operation in the normal operation of the car, and operable, with respect to overload conditions, to control one or more safety operations at predetermined loads.

Another object is to so arrange the means described as to provide floating support for the elevator car, whereby the starting and stopping of the car is cushioned and carried out smoothly, without jar or bounce.

It is also the object to provide a system, as described, with adjusting means for securing the same ratio between the displacement of the car and the movement of the system, under load or varying, and for resetting the system to normal no-load position, for cars of different capacities.

Other objects and advantages will more fully appear.

In the drawings accompanying and forming part of this specification:

Figure 1:
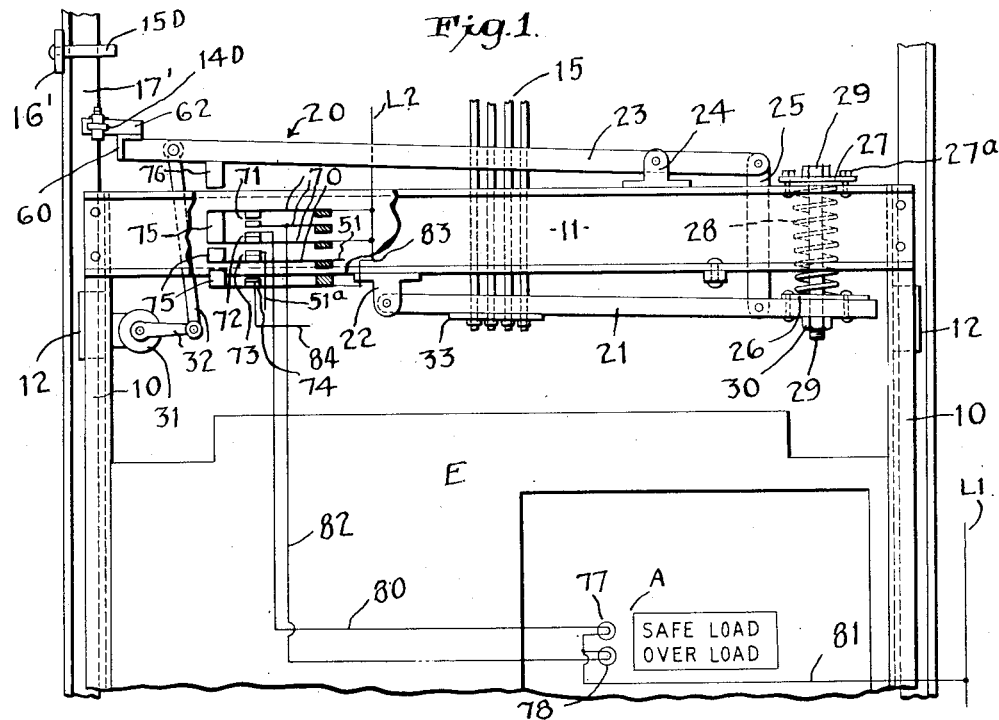
Fig. 1 shows, in elevation, a multiplying lever system, movable proportionately to load applied to the car, and carrying means controlling a circuit for initiating car-stopping operations under normal conditions, and means for controlling, under irregular conditions certain safety circuits, schematically illustrated.

In the operation of passenger elevators, the industry has long recognized the advantages and protection afforded by level floor stops. With respect to this operation, elevator control systems in which the car-stopping operation is automatically controlled present a peculiar problem. In this connection, it has been known to provide load balancing and compensating means, movable proportionately to load for the purpose of varying the initiation of car-stopping operations under different conditions of load. These means, generally, have not been satisfactory. In the known arrangements of this character the floor stopping switches are moved mechanically by means of a tape, chain, or cable, passing over sheaves and secured to the load compensator. As will be readily understood the momentum and inertia of these parts is excessive, requiring large and cumbersome dashpot resistance for the compensator and this, in turn, reduces considerably the capacity of the compensator to reset to neutral position prior to each restarting operation.

In order that the precision required of floor stops might be better obtained, the leveling arrangement now more commonly employed are separately operable and act independently of load. With leveling means of this type the car will always be in the same position with respect to the floor at the initiation of car-stopping operations, regardless of load, although the slide of the car, as will be understood, is different with different loads. Under these conditions overrun frequently occurs, requiring one or more reversals of the elevator hoisting motor before the car is brought level with the floor. There is also the objection that a number of extra parts must be carried on the car and arranged in the hatchway and the control system must be considerably rearranged.

From the above it will appear that disadvantages are associated with a safeguard feature desirable in the normal operation of all passenger elevators, i. e. to bring the car to a precise stop level with each floor at which a stop is made, regardless of the changing load condition of the car.

In the operation of passenger elevators another, irregular and undesirable condition that often occurs is overloading of the cab, but elevator control systems as now known and in use do not include operations, conditioned on predetermined loads, for warning or safeguarding passengers with respect to overloading. With cars of the attendant-controlled type, a starter or an operator must be relied upon, who can only estimate when a car has reached its safe-load limit and limit the number of passengers in accordance with such estimate. An even more undesirable condition obtains with respect to automatic, passenger-controlled cars, where there is present neither a starter nor an operator, and no one is responsible for maintaining, or acts to keep the load within the capacity of the car.

The disadvantages pointed out above are overcome by the present invention, which, briefly, in the preferred form contemplates the use of a single means to control the initiation of car-stopping operations to effect precise, level floor stops regardless of the load under which the car is operating and the direction of car travel, and to control, at predetermined loads, means operable to perform safeguard functions with respect to overloading of the car. In the arrangements shown and about to be described, the load-balancing and compensating system carries means adapted to momentarily close a circuit at the respective floors, whereby the initiation of car-stopping operations is varied in accordance with load and direction of travel of the car, and carries separate means operable at predetermined loads, to control one or more additional safety circuits. These circuits, as an indication of overload, may comprise a circuit for operating a visual or audible signal, or a circuit adapted to be opened to render hall pushbuttons inoperative, or a circuit can be opened to open a control circuit for the hoisting motor, or a circuit can be closed to cause the car or hall door, or both, to start to close. As will be understood, these examples are merely illustrative and can be employed either singly or in various combinations.

Turning now to the drawings, the elevator car E is carried, as usual, in a sling 10, which comprises a crosshead 11 formed by two spaced channel irons. Secured to opposite sides of the sling are guide shoes 12 which receive the flanges of guide rail 17'. Adjustably secured to the guide rail are contact brackets 16', one for each floor, each of which brackets carry an up and a down direction contact pin, 15U, 15D. The car is suspended in the hatchway by means of lifting cables 15, and, as load is placed on the car, the car and its sling will be displaced relatively to the lifting cables.

Figure 2:
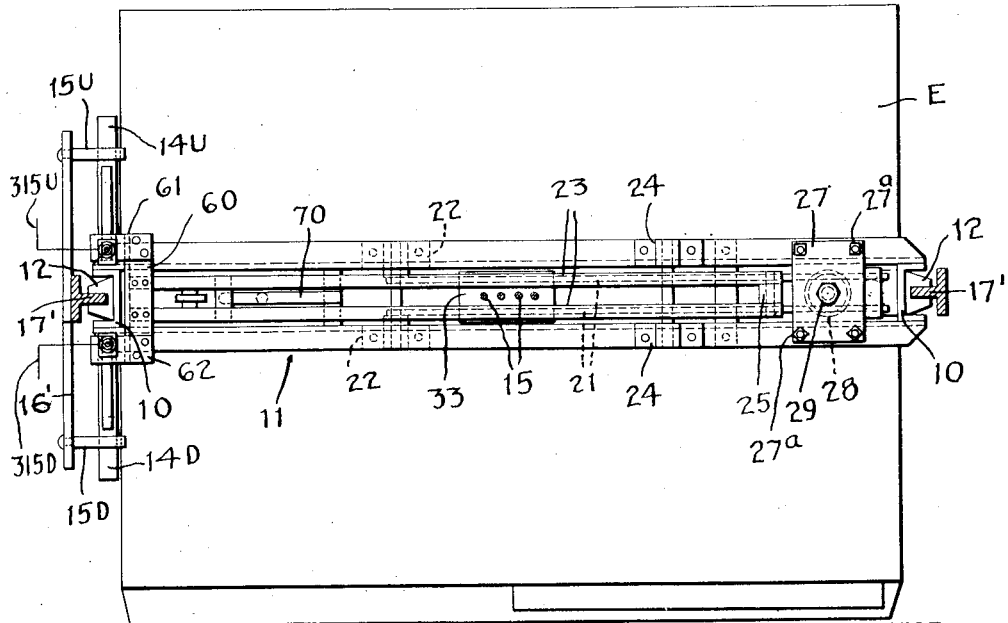
Fig. 2 is a plan view of the arrangement shown in Fig. 1.

In accordance with the invention, means are provided, which are movable in proportion to the displacement of the car under load. In Figures 1 and 2, a multiplying lever or compound lever system is shown, and in Figure 3, a pressure-controlled, preferably hydraulically operated arrangement, is illustrated. As will be understood, these means can be variously arranged. They can, for example, be employed with a car of the movable platform type, but, preferably, and for the reasons more fully given hereinafter, the load-responsive system is supported on the crosshead of the car sling.

In the different views the load responsive system is designated as a whole by the numeral 20. In Figures 1 and 2 it comprises a lower, double-armed lever 21 pivoted at one end on a pin carried by brackets 22 secured to the under face of the spaced crosshead irons, an upper, double-armed lever 23 pivoted on a pin carried in brackets 24 bolted to the top of the crosshead irons, and a connecting link 25, pivotally connecting the lower and upper lever. A plate 26 extends between and is secured to the arms of the lower lever adjacent its free end, and a plate 27 spans the crosshead irons and is adjustably secured thereto by bolts 27a. Between the plates, a compression spring 28 is arranged, and an adjusting bolt 29 having its headed end resting on plate 27, passes through the plate, within the coils of the spring, through the plate 26, and is secured in place by means of a nut 30 threaded on the lower end of the bolt. Secured to the arms of the lower lever, intermediate its ends, is a plate 33 to which are fastened the lifting cables 15, which extend upwardly between the levers and the crosshead irons.

In accordance with the invention, by turning nut 30, the bolt 29 can be taken up or let out to increase or decrease, respectively, the non-useful, or tare load resistance of spring 28, and by the adjustment of bolts 27a, plate 27 can be moved toward or from the crosshead to reset the lever system to normal no-load position. By these means the system can be so adjusted as to secure the same ratio between the displacement of the car and the movement at the free end of the upper lever, and to reset the system to normal no-load position, for cars of different capacities. This avoids the necessity of providing a special arrangement wherein the spring is particularly calibrated for individual car capacities.

As shown schematically in Figure 1, there is secured to car sling 10 a shock-absorber 31. This is preferably of the automobile type, such as what is commonly known as an "Houdaille" shock-absorber. The free end of lever 23 is connected with the shock-absorber as by a connecting rod 32. This is a particularly advantageous arrangement for car stopping and starting operations, as the compression spring 28 and the liquid shock-absorber cooperate to prevent "dancing" motion and establish a substantially "dead beat" action at the free end of the upper lever; and also perform a cushioning function, whereby the starting and stopping of the car is carried out smoothly, without jar or bounce.

Figures 3, 4:
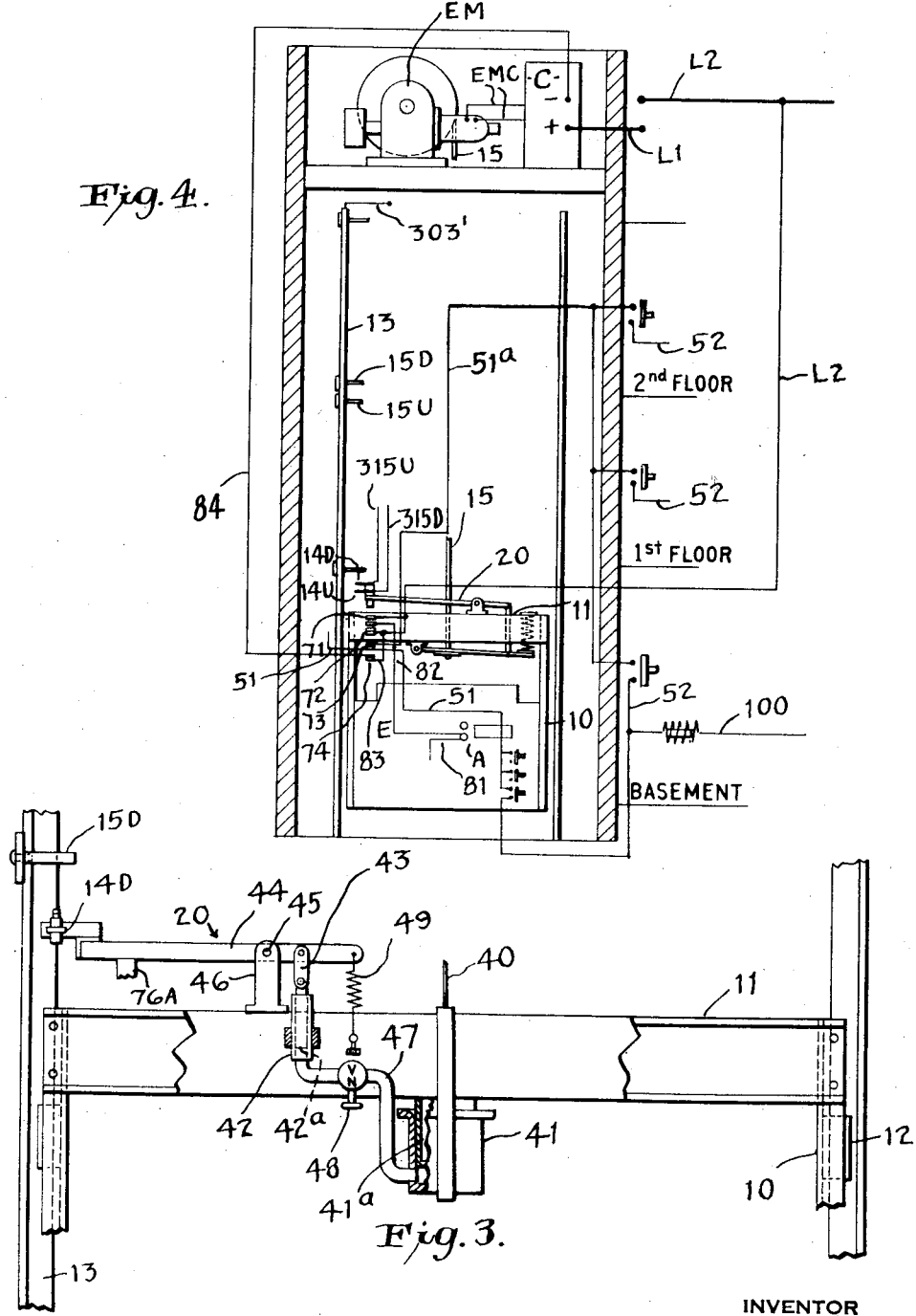
Fig. 3 illustrates a modified form in which a fluid pressure-controlled system is employed, and, Fig. 4 is a schematic view showing a car in a hoistway, carrying load-responsive means and indicating various circuits controlled by said means under normal and irregular conditions.

Figure 3 illustrates a modified form of the invention, in which the system 20 is hydraulically operated. In this arrangement the car lifting cables are secured to the top of a yoke 40 which passes about the crosshead 11 of the car sling. Secured to the bottom of the yoke is a master cylinder 41 in which a piston 41a is operable. An actuating cylinder 42 of less diameter than the master cylinder is secured between the crosshead irons and its piston 42a is pivoted at its upper end to a connecting link 43, which, in turn, is pivoted to the short arm of a lever 44, fulcrumed, intermediate its ends, on a pin 45 carried by bracket 46 secured to the crosshead. A flexible tube 47 communicably connects cylinders 41 and 42. The flow of liquid through the tube is controlled as by means of a needle valve 48, and a tension spring, as indicated at 49 is used to return the system to neutral position as load is removed.

The tension of spring 49 can be adjusted in the usual manner, and this together with the needle valve for controlling the amount of flow through the tube will permit the arrangement shown in Figure 3 to be used for cars of different capacities, as described in connection with Figures 1 and 2.

In the arrangement shown in Figure 3, the hydraulic control will function, as described previously, to eliminate "dancing" at the free end of the lever, and provide a substantially dead beat action. It also provides floating support for the car and acts to cushion the car starting and stopping operations.

In the preferred arrangement, about to be described, the system 20 acts as a load-balancer and compensator to perform the safeguard function of so controlling the initiation of normal car-stopping operations as to effect precise, level floor stops, regardless of the load under which the car is operating, and the direction of travel of the car, and also controls at predetermined loads, one or more circuits for controlling additional safeguard functions with respect to the load condition of the car.

In the interests of clarity and conciseness, the arrangement, as above, will be described, as shown schematically in Figure 4, in combination with an elevator control system like that described in my prior Patent No. 2,014,821. In order to avoid unnecessary duplication of illustration and description, in the present disclosure the same reference numerals have been applied to elements which are similar to parts shown in my prior patent, and similar circuits, here not shown complete, have been clearly indicated by applying to the conductor leads the same reference characters as are used in my prior patent.

In my prior Patent No. 2,014,821, there is disclosed an arrangement whereby car stopping operations are initiated by the closing of a circuit in the hatchway, the circuit comprising a rail in the hatchway, contact pins conductively connected with the rail and cooperating contact wipers carried by an element movable with the car. The contact wipers are carried in fixed position by a guide shoe for the car, which shoe, of course, does not move relatively to the car in proportion to load and, consequently, no variation of the initiation of car-stopping operations will occur.

In accordance with the present invention the cooperating contact wipers are carried at the free end of a lever of the load-balancing and compensating system 20, which will move relatively to the car in proportion to applied load, and will vary the initiation of car-stopping operations in accordance with load.

As shown, see Figure 2, the lever of system 20 pivoted above the crosshead, carries at its free end an angle iron 60 having extending arms on which are mounted insulating blocks 61, 62 and contact brushes 14U, 14D are secured in and extend at right angles to the insulating blocks. The construction of the insulating blocks and contact brushes or wipers is the same as the blocks and wipers described in Patent No. 2,014,821, referred to. The contact brushes or wipers are adapted to engage contact pins 15U, 15D carried by brackets 14 adjustable along the guide rail 17'. The rail 17' is connected, in the same manner as disclosed in my prior patent, with the negative line, as indicated by the same conductor lead 303', and the contact brushes carried by the compensator, as indicated by the leads bearing the same reference characters 315U, 315D, are connected, as described in my prior patent, through an up and a down relay, respectively, to positive line, to close a circuit to initiate car-stopping operations. In this manner the load-balancing and compensating system 20 is adapted to control the initiation of car-stopping operations.

In addition to the above function the system 20 also serves to control, at predetermined loads, one or more safety circuits. This arrangement is shown diagrammatically in Figures 1 and 4, as comprising spring fingers 70 secured to insulating supporting crosspieces extending between the crosshead irons, the free end of each spring carrying a contact. The contacts are arranged in cooperating pairs 71, 72, 73, 74. Certain of the spring fingers, as shown extend beyond the contacts and carry insulating spacing blocks 75.

At a predetermined load the proportionate downward movement at the outer end of the upper lever will be of such extent as to cause the insulating block 76 carried by the lever to engage the upper spring finger 70 to close contacts 71 and open contacts 72. The opening of contacts 72 will open a circuit for a lamp 77 of an overload annunciator indicated at A. This circuit leads from line L2, through contacts 72, line 80 across the terminals of the lamp and through conductor 81 to line L1. The closing of contacts 71 will close a circuit from line L2, through contacts 71, lead 82, across the terminals of lamp 78, designating "Overload" and through lead 81 to line L1.

With additional load and further downward movement of the free end of the lever, a circuit will be opened to render the hall pushbuttons inoperative. By this operation no further calls will be registered from the floors and no passengers will be picked up at the landing floors until sufficient load is removed to permit the lever to return upwardly and the circuit to reclose.

In my prior patent referred to, the pushbutton circuit led from positive line through conductor 51 to one of a pair of contacts associated with each pushbutton, and from the other contact of each pair through line 52, a corresponding floor relay, and wire 100 to negative line. In the present arrangement, as shown, see Figure 4, the conductor 51 leads to the lower of two contacts 73 controlled by the system 20, and from the lower contact, conductor 51 continues to one of the pair of contacts for each car button, and from the other of each of said pair of contacts through wire 52, a corresponding floor relay and wire 100 to negative line, as previously described. With respect to hall pushbuttons, however, the circuit leads from the upper of contacts 73, through conductor 51a, to one of the pair of contacts associated with each hall button and from the other of each pair of hall contacts through wire 52, the corresponding floor relay and wire 100 to negative line, as before. From the above it will be clear that the load compensator in opening contacts 73 will maintain the car pushbuttons in operating condition but will render hall pushbuttons inoperative until, as above described, sufficient load is removed to permit the lever of the compensator to move upwardly and the circuit to reclose at contacts 73.

Another desirable precaution that is provided is to open a control circuit for the hoisting motor under excessive overload and thus prevent the operation of the car until the excessive load is removed.

As shown in Figure 4 there is illustrated diagrammatically, an elevator controller C, which is preferably similar to that disclosed in my prior patent referred to and in my copending application Ser. No. 729,689, filed June 8, 1934 now Patent No. 2,135,204, dated November 1, 1938. This controller as has been fully described in the disclosures referred to, controls circuits for operating a hoisting motor for the car. Under excessive overload a circuit leading from line L2 through conductor 83, contacts 74, and line 84 to the controller C, will be opened by the downward movement of the lever separating contacts 74, thus establishing an opening in a control circuit for the hoisting motor and preventing operation of the car until the excessive overload has been removed and the lever has returned upwardly to permit contacts 74 to reclose.

Other protective features can also be employed, as, for example, a car door closing arrangement, such as is described and shown in my copending application referred to above, can be caused, under control of the load-balancer and compensator, to automatically start to close the car door at a predetermined load.

As stated, the means and circuits for controlling the above described safeguard operations have been shown and described schematically and can be otherwise arranged. For example, it is contemplated extending the shaft of shock absorber 31, mounting a commutator drum on the shaft and providing contact fingers cooperating with contacts and insulated portions of the drum to control the above described circuits under overload conditions.

In both my prior patent referred to herein and in Fig. 4 of the present application, merely with the object of simplicity of illustration and description in view, the invention has been described in connection with a pushbutton system of the continuous pressure type. But, as will be readily understood, the invention can and is intended to be employed with other types of elevator control systems. It can be used to particular advantage, for example, with a control system of the single-push, two-button type shown and described in my copending application referred to herein. In the pending application the pressure of buttons in the car and at the landings will energize corresponding floor relays. Each relay, in turn, actuates pairs of contacts, one pair of which, common to the car and hall buttons, closes a self-holding circuit for an associated floor relay.

When, as intended, the present invention is used in combination with the above system, at a predetermined load, the opening of contacts 73, here shown and described, will open-circuit the above-described self-holding circuit to deenergize all operated floor relays and cancel all calls that have been entered. Upon re-pressure of car pushbuttons, another self-holding circuit, individual to the car buttons, will be established to re-energize corresponding floor relays. By this arrangement, as will be clear to those skilled in the art, calls from the car can be reentered, but calls from the landing floors will remain canceled and can not be registered until sufficient load has been removed to permit closing of the first-named, original self-holding circuit for the floor relays.

In operation, taking for example a conventional installation of a regularly counterweighted car of 1800 pounds capacity and adapted to travel at the rate of 100 feet per minute, it has been found in practice, that under no-load condition with the point of initiation of car stopping operations properly arranged for down and up stops and the brake properly set to automatically stop the car level with the floors, without jar, there will occur between the normal, no-load slide for the down and up direction, respectively, a variation of from four to six inches at full load. This variation will be plus and minus for the down and up direction, respectively. Without leveling arrangements, it will be clear that at each floor at which the car is to stop at full load in the downward direction, the slide will be from four to six inches longer than the normal, no-load down slide, and that under full load traveling upward, the slide will be from four to six inches shorter than the normal, no-load up slide; in each instance bringing the car to rest with its platform four to six inches below the floors at which the car is to stop.

The system 20 shown and described herein is adapted to precisely compensate for the above-described variations in car slide. The slight relative movement between the car sling 10 and lifting cables 15, as load is applied to the car, is translated into a measured, proportional movement at the free end of lever 23, Figure 1, or lever 44, Figure 3. Thus under load there is a proportionate movement of the free end of the lever toward the car. With the car traveling downward under full load, the lever will be four to six inches closer to the top of the car than its normal no-load position, and, with respect to the floors, the car position will be six inches above, or farther from its normal no-load position when the hatchway contact pins 15U, 15D, are wiped by the contact fingers 14U, 14D carried at the free end of the lever. If a down stopping circuit for a floor has been partially prepared, as described in my prior patent, the four to six inch advanced engagement between a contact pin 15D and a contact finger 14D, will close a circuit to initiate car-stopping operations. The time of cutting off the motor and applying the brake will be advanced to compensate for the four to six inch increase over normal, no-load, down slide, to bring the car to rest level with the floor. During upward travel under full load with the lever, as before, moved four to six inches closer to the car, the car, with respect to the floors, will be in a position four to six inches above, or closer to its normal, no-load position, when the hatchway pins 15U, 15D are engaged by the wipers 14U, 14D carried by the lever, and this four to six inch retarded engagement between the contacts will provide a time-delayed shut off for the hoisting motor and for the application of the brake to compensate for the four to six inch shorter slide in the up direction.

With the car at rest, the safe load lamp 77 of the indicator A will normally be illumined. As the weight of passengers approaches the capacity of the car, the load-measured downward movement of the compensator lever will control circuits at contacts 71, 72, to illumine the "Overload" lamp 78, and extinguish the "Safe Load" lamp, to warn passengers against further increase of load. If one or more passengers should enter the car, the continued load-proportioned downward movement of the compensator lever will act, to open a circuit at the contacts 73 to render the hall pushbuttons inoperative. In this condition the car can proceed but will not stop to pick up additional passengers at the floor landings until the additional overload has been removed to permit the lever to move upwardly and the contacts

73 to reclose. If with the "Overload" lamp illumined, and the hall pushbuttons rendered inoperative as a result of overload, passengers continue to enter the car, then the further downward movement of the compensator under load will open at contacts 74, a control circuit for the elevator motor circuit, to prevent operation of the elevator motor and car until the excessive overload has been removed.

Having thus described the invention and its operation, it will be apparent that there are many advantages associated with the disclosure. It will be noted, that as the car travels in the hoistway there is only intermittent floor by floor wiping engagement between the contact pins and the fingers carried by the compensator lever. There is no mechanical connection between the floor switches. The lever system is not required to overcome momentum and inertia forces of considerable magnitude, nor is it necessary to provide large and cumbersome resistance for the compensator system. In accordance with the invention ball bearing pivots are employed and mechanical friction is reduced to a minimum. The system is sensitive and functions to precisely and accurately measure the load, whereby the exactness of operation required to effect level floor stops regardless of changing load and direction of travel of the car, is attained.

It will be understood that various changes and modifications can be made in carrying out the invention without departing from the principle thereof.

What I claim is:

1. In combination with an elevator car having lifting cables, a load-balancing and compensating system, said lifting cables being shackled to one of the members of said system, means carried by another member of the system movable in proportion to load applied to the car, directly controlling a circuit to initiate car-stopping operations, and separate means carried by said member acting at predetermined loads to control a plurality of other circuits, whereby said member acts to control the initiation of car stops relatively to load to perform the safeguard function of providing level floor stops, and acts to control the operation of said other circuits and the performance of safeguard functions with respect to definite, predetermined load conditions of the car.

2. In combination with an elevator car movable in a hatchway, lifting cables for said car, a rail in the hatchway, contact members conductively connected with the rail, a load-balancing and compensating system, said lifting cables being directly shackled to one of the members of said load-balancing and compensating system, and flexible contact wipers carried by another member of the system movable in proportion to load applied to the car, for engaging the hatchway contacts to close a circuit to initiate car-stopping operations, and separate means carried by said member acting at predetermined loads to control other circuits, whereby said member acts to control the intiation of car stops relatively to load, to perform the safeguard function of providing level floor stops, and acts to control the operation of said other circuits and the performance of safeguard operations with respect to definite, predetermined load conditions of the car.

3. In an elevator control system the combination with a car movable in a hatchway past a plurality of floors, of a push-button arranged at each floor, a load-balancing and compensating system, the car being suspended from said system, means carried by a member of the system moveable in proportion to load for directly controlling a circuit for initiating car-stopping operations, and separate means carried by said member of the system acting at a predetermined load to open a circuit and render said hall-pushbuttons inoperative.

4. In an elevator control system the combination with a car movable in a hatchway past a plurality of floors, of a pushbutton arranged at each floor, a load balancing and compensating system, the car being suspended from said system, means carried by a member of the system movable in proportion to load for directly controlling a circuit for initiating car-stopping operations, a load-annunciator, and separate means carried by said member of the system acting at predetermined loads to first close a circuit for said load-annunciator, and thereafter open a circuit to render said hall pushbuttons inoperative.

5. In combination with an elevator car, a lever forming part of a load-balancing and compensating system and adapted to be moved in proportion to load applied to the car, means for hydraulically dampening the motion of said lever, means carried by said lever for operating a circuit to control a safeguard function with respect to the car, and another lever connected to said first mentioned lever and having adjusting means for securing the same ratio between the displacement of the car and the movement of the free end of the lever under load, and for resetting said lever to normal no-load position, for cars of different capacities.

6. In combination with an elevator car and its sling, the sling comprising a crosshead, a multiplying lever system carried by the crosshead, the car being suspended from said multiplying lever system, and the system being movable in proportion to load applied to the car, said system comprising a lower lever, an upper lever, a link pivotally connecting the levers, and a compression spring located at the free end of said lower lever and adapted to resist movement of the lower lever, and means mounted at the free end of the upper lever for operating a circuit to control a safeguard function with respect to the car, the operation of said circuit and said safeguard function being thereby dependent upon the load condition of the car.

7. In combination with an elevator car and its sling, the sling comprising a crosshead, a multiplying lever system carried by the crosshead, the car being suspended from said multiplying lever system, and the system being movable in proportion to load applied to the car, said system comprising a lower lever pivoted at one end, an upper lever fulcrumed intermediate its ends, a link lever pivotally connecting the levers, an adjustable spring located at the free end of said lower lever and adapted to resist movement of the lower lever under load, means carried at the free end of the upper lever for operating a circuit to control a safe-guard function with respect to the car, a shock absorber secured to the car sling, and connections between the shock absorber and the free end of said upper lever, said shock-absorber being adapted to establish substantially dead beat action at the free end of the upper lever, and said shock absorber and spring cooperating to prevent the transmission of shocks and jars to the car, during starting and stopping operations.

8. In combination with an elevator car and its sling, the sling comprising a crosshead, a multiplying lever system carried by the crosshead, the car being suspended from said multiplying lever system, and the system being movable in proportion to load applied to the car, said system comprising a lower lever pivoted at one end, an upper lever fulcrumed intermediate its ends, a link pivotally connecting the levers, an adjustable compression spring located at the free end of said lower lever and adapted to resist movement of said lower lever under load, means carried at the free end of the upper lever for operating a circuit to control a safeguard function with respect to the car, a shock-absorber secured to the car sling and connections between the shock-absorber and the free end of the upper lever to establish substantially dead beat action at the free end of the upper lever, said shock absorber and spring cooperating to prevent the transmission of shocks to the car during starting and stopping operations, means for adjusting the resistance of the spring to secure the same ratio between the displacement of the car and the movement at the free end of the upper lever, under load, and means for adjusting the position of the spring to reset the system to normal, no load position for cars of different capacities.

9. In combination with an elevator car, a car sling comprising crosshead channel irons, and lifting cables for the car, a load-balancer and compensator comprising a lower lever pivoted between the brackets secured to the underface of the crosshead irons, a securing plate for the lifting cables carried intermediate the ends of the lower lever, a plate carried adjacent the free end of the lower lever, a plate adjustably secured to the top of, and extending between the crosshead irons, a compression spring having its opposite ends resting against the last-named plates, an upper lever pivoted between brackets mounted on the top of the crosshead irons, and a link pivotally connecting the lever, the displacement of the car relatively to the lifting cables, under load, causing upward movement of the lower lever against predetermined resistance of said spring, causing the free end of the upper lever to move downwardly toward the car proportionately to load, a shock-absorber secured to the car sling, connections between the shock absorber and the upper lever providing substantially dead beat action at the free end of the lever during stopping operations, means carried at the free end of the upper lever for directly controlling a circuit for initiating car-stopping operations relatively to load, and an adjusting bolt adapted to vary the resistance of the spring to secure the same ratio between the displacement of the car and movement of the free end of the upper lever, under load, and said adjustable plate being adapted to reset the compensator to normal, no-load position, for cars of different capacities.

10. In combination with an elevator car movable in a hatchway, a plurality of fixed contacts arranged in said hatchway, and a load-measuring system, said load measuring system comprising a compound lever mounted on said car, one of the levers of said load-measuring system carrying cooperative contacts which are automatically positioned in respect and in accordance with the load of the car so as to cause the car to always stop at definite points in said hatchway upon engagement of the fixed contacts with the cooperative contacts carried by said load-measuring device.

11. In combination with an elevator car movable in a hatchway, hoisting cables for said car, a plurality of fixed contacts arranged in said hatchway, and a load-balancing and compensating system comprising pivoted levers carried by said car, said hoisting cables being directly shackled into one of the pivoted levers of said load-balancing and compensating system, and another pivoted lever of said load-balancing and compensating system carrying cooperative contacts which are automatically positioned in respect and in accordance with the load of the car so as to cause the car to always stop at definite points in said hatchway upon engagement of the fixed contacts in the hatchway with the cooperative contacts carried by said load-balancing and compensating system.

12. In combination with an elevator car and its sling, a load-balancing and compensating mechanism comprising upper and lower levers pivoted on said sling, a link connecting said upper and lower levers, means carried at the free end of said upper lever for directly controlling a circuit for initiating car-stopping operations relatively to load, a spring located at the free end of said lower lever and adapted to resist movement of said lower lever, and a shock-absorber mounted between the free end of said upper lever and said sling.

13. In combination with an elevator car, hoisting cables for said car, and a load-balancing and compensating system comprising a lever, said hoisting cables being directly shackled to said lever, a spring for adjustably controlling said lever, a multiplying lever connected to said lever, a hydraulic shock-absorber connected to said multiplying lever and a plurality of switches operated by the end portion of said multiplying lever.

14. In combination with an elevator car, hoisting cables for said car, and a load-balancing and compensating system comprising a hydraulic container having a movable member, said hoisting cables being secured to said movable member, a smaller container, a movable member for said smaller container, connections between said containers, the movable member of the first mentioned container causing the fluid in the system to give an amplified movement to the movable member of the smaller container, a yielding lever under control of the movable member of the smaller container said lever having a spring secured thereto and operating a plurality of switches.

15. In combination with an elevator car, hoisting cables for said car, and a load-balancing and compensating system comprising a master cylinder, a fixed piston for said master cylinder, the hoisting cables being shackled to said master cylinder, an actuating cylinder, a valved pipe connection between said master cylinder and said actuating cylinder, a yielding lever under control of said actuating cylinder, and a plurality of switches operated by the end portion of said lever.

16. In an elevator control system the combination of a car movable in a hatchway, a load-balancing and compensating system mounted on the crosshead of the car, said load balancing and compensating system comprising a lever and a multiplying lever connected together, the car being suspended from the lever, and the multiplying lever carrying means for operating stop initiating switches which function at varying distances from the floor landings commensurate with the load and direction of travel of the car.

17. In combination with an elevator car movable in a hatchway past a plurality of floors, lifting cables for said car, push buttons for said floors, contact members arranged in said hatchway and a load-balancing and compensating system carried by said car, said load-balancing and compensating system comprising pivoted levers, a spring adapted to position said pivoted levers, and a shock absorber to establish dead beat action of the levers, said lifting cables being directly shackled to one of the levers of said load-balancing and compensating system, and flexible contact wipers carried by another lever of said load-balancing and compensating system, said flexible contact wipers being movable in proportion to load applied to the car and adapted to engage said hatchway contacts to close a current to initiate car-stopping operations and provide level floor stops for the floor when a push-button has been pressed.

MARCELLUS STALEY.